United States Patent [19]
Moriguchi et al.

[11] Patent Number: 6,054,025
[45] Date of Patent: Apr. 25, 2000

[54] SOLID POLYELECTROLYTIC MODULE AND SOLID POLYELECTROLYTIC APPARATUS USING SAME

[75] Inventors: Tetsuo Moriguchi; Tetsurou Ogushi, both of Tokyo, Japan

[73] Assignee: Mitsubishi Denki Kabushiki Kaisha, Tokyo, Japan

[21] Appl. No.: 09/192,308

[22] Filed: Nov. 16, 1998

[30] Foreign Application Priority Data

Nov. 19, 1997 [JP] Japan ..................................... 9-318275
Jun. 16, 1998 [JP] Japan ................................... 10-167881

[51] Int. Cl.⁷ .................................................. C25B 9/00
[52] U.S. Cl. ............................ 204/258; 204/253; 429/32; 429/36; 429/38
[58] Field of Search .................................. 429/32, 36, 38; 204/253, 258

[56] References Cited

U.S. PATENT DOCUMENTS

| 5,034,288 | 7/1991 | Bossel ........................................ 429/32 |
| 5,508,128 | 4/1996 | Akagi ......................................... 429/32 |
| 5,736,017 | 4/1998 | Moriguchi et al. ...................... 204/253 |

FOREIGN PATENT DOCUMENTS 8-134679  5/1996  Japan .
9-217186  8/1997  Japan .

*Primary Examiner*—Bruce F. Bell
*Attorney, Agent, or Firm*—Sughrue, Mion, Zinn, Macpeak & Seas, PLLC

[57] ABSTRACT

A plurality of solid polyelectrolytic elements are stacked via spacers having conductive metal plates, and together with air channels, form three-dimensional electrolytic reaction surfaces. The plurality of solid polyelectrolytic elements are stacked by connecting the same electrically in series so that surfaces of the same polarity face each other.

8 Claims, 14 Drawing Sheets

SOLID POLYELECTROLYTIC MODULE AND SOLID POLYELECTROLYTIC APPARATUS USING SAME

BACKGROUND OF THE INVENTION

1. Field of the Invention

The present invention relates to a solid polyelectrolytic module for electrolyzing steam in an atmosphere by the use of an ion conductive solid polyelectrolyte membrane and deriving for use a new function by the use of properties of the electrolytic product, or specifically, to a module configuration which permits downsizing of a module main body and a DC power source system. Further, the invention relates to a solid polyelectrolytic apparatus which derives favorable features of the solid polyelectrolytic module to the maximum extent, and ensures stability of operation of the solid polyelectrolytic module.

2. Description of the Related Art

FIGS. 14 and 15 are a longitudinal sectional view illustrating an overall configuration and a longitudinal sectional view illustrating the exploded state, respectively, of a solid polyelectrolyte membrane electrolysis apparatus which electrolyses water by the use of a hydrogen ion conductive solid polyelectrolyte membrane as disclosed in Japanese Unexamined Patent Publication No. 8-134679.

In FIGS. 14 and 15, a solid electrolyte membrane electrolysis apparatus 1 has a structure in which a plurality of disk-shaped solid electrolyte membrane units 8 are arranged in such manner that electrodes of the same polarity face each other, each of the solid electrolyte membrane units 8 comprises a disk-shaped solid electrolyte membrane 2, disk-shaped porous power feeders 3 and 4 attached to the both surfaces of the membrane 2, disk-shaped anode plate 5 and cathode plate 6 arranged outside the feeders 3 and 4, and sealing members 7 each comprising a disk-shaped gasket, attached to the outside of the electrode plates 5 and 6.

The solid electrolyte membrane 2 and other members, while being in a disk shape, may be in a rectangular shape.

Upon arranging the solid electrolyte membrane units 8 with the sides of the same polarity arranged opposite to each other, an insulating spacer 9 made of a plastic material is inserted between two adjacent solid electrolyte membrane units 8. Outside the solid electrolyte membrane units 8 at the both ends, end plates 10 made of stainless steel are provided.

A pure water feeding channel 11 for feeding pure water to the porous power feeders 3 on the anode side of the solid electrolyte membrane unit 8 and an oxygen outlet channel 12 for taking out oxygen gas are provided in the solid electrolyte membrane electrolysis apparatus 1. Similarly, a hydrogen outlet channel 13 for taking out hydrogen gas from the porous power feeder 4 on the cathode side of the solid electrolyte membrane unit 8 is also arranged. The electrode plates are electrically connected with an external wire 14 to feed the power feeder with power.

In the solid electrolyte membrane electrolysis apparatus 1 having the configuration as described above, pure water is first fed from a pure water feeding system (not shown) through the pure water feeding channel 11 to the porous power feeder 3 on the anode side of the solid electrolyte membrane unit 8. The pure water thus fed is electrolyzed on the anode side of the solid electrolyte membrane unit 8 to cause the following reaction:

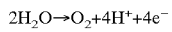

thus producing oxygen gas. Water and oxygen gas are taken out from the porous power feeder 3 through the channel 12, and oxygen gas is thus collected.

On the cathode side of the solid electrolyte membrane unit 8, on the other hand, $H^+$ generated on the anode side passes through the solid electrolyte membrane 2 and causes the following reaction:

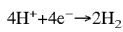

This produces hydrogen gas. Hydrogen gas is taken out from the porous power feeder 4 via the hydrogen outlet channel 13 and collected.

Water is electrolyzed through the aforementioned operations to obtain hydrogen and oxygen. Power required for electrolysis is fed through the external wiring via the electrode plates 5 and 6 to the porous power feeders 3 and 4.

The conventional solid electrolyte membrane electrolysis apparatus is thus an apparatus to be applied when water is to be electrolyzed into oxygen and hydrogen, and is not designed to electrolyze steam contained in the air.

SUMMARY OF THE INVENTION

The present invention has an object to electrolyze steam contained in the air to derive and utilize new functions by the use of properties of the electrolytic product, and to provide a mechanically strong, compact and inexpensive solid polyelectrolytic modules suitable for such purposes.

Further, the invention provides a solid polyelectrolysis apparatus which derives electrolytic properties of the aforementioned solid polyelectrolytic module to the largest possible extent, and ensures stable operations.

In order to achieve the above object, according to one aspect of the present invention, there is provided a solid polyelectrolytic module comprising a plurality of solid polyelectrolytic elements stacked so as to constitute an air path between two adjacent solid polyelectrolytic elements in a state where spacers which at least a part thereof serves as conductive contact regions are interposed therebetween, respectively, each of the solid polyelectrolytic elements being formed by thermocompression bonding of porous electrodes with the both surfaces of a hydrogen ion conductive solid polyelectrolyte membrane, respectively; wherein the plurality of stacked solid polyelectrolytic elements are electrically connected to each other in series in such manner that one porous electrode of each of the solid polyelectrolytic elements is electrically connected to one porous electrode of a solid polyelectrolytic element adjacent thereto on one side via the conductive contact region of the spacer, and the other porous electrode of each of the solid polyelectrolytic elements is electrically connected to the other porous electrode of a solid polyelectrolytic element adjacent thereto on the other side via the conductive region of the spacer; and wherein the air paths formed between the solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of the plurality of solid polyelectrolytic elements and the other porous electrode of the solid polyelectrolytic element arranged at the other end of the plurality of solid polyelectrolytic elements.

According to another aspect of the present invention, there is provided a solid polyelectrolytic apparatus comprising: a solid polyelectrolytic module having a plurality of solid polyelectrolytic elements stacked so as to constitute an air path between two adjacent solid polyelectrolytic elements in a state where spacers which at least a part thereof serves as conductive contact regions are interposed therebetween, respectively, each of the solid polyelectrolytic elements being formed by thermocompression bonding of porous electrodes with the both surfaces of a hydrogen ion conductive solid polyelectrolyte membrane, respectively, wherein the plurality of stacked solid polyelectrolytic elements are electrically connected to each other in series in such manner that one porous electrode of each of the solid polyelectrolytic elements is electrically connected to one porous electrode of a solid polyelectrolytic element adjacent thereto on one side via the conductive contact region of the spacer, and the other porous electrode of each of the solid polyelectrolytic elements is electrically connected to the other porous electrode of a solid polyelectrolytic element adjacent thereto on the other side via the conductive region of the spacer, and wherein the air paths formed between the solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of the plurality of solid polyelectrolytic elements and the other porous electrode of the solid polyelectrolytic element arranged at the other end of the plurality of solid polyelectrolytic elements; and a bypass circuit having a circuit configuration in which the bypass circuit is electrically connected in parallel between one porous electrode and the other porous electrode of the solid polyelectrolytic element, and a current steeply flows when the voltage between the both porous electrodes exceeds a set voltage value.

DESCRIPTION OF THE PREFERRED EMBODIMENTS

Embodiments of the present invention will now be described with reference to the drawings.

First Embodiment

Figure 1:
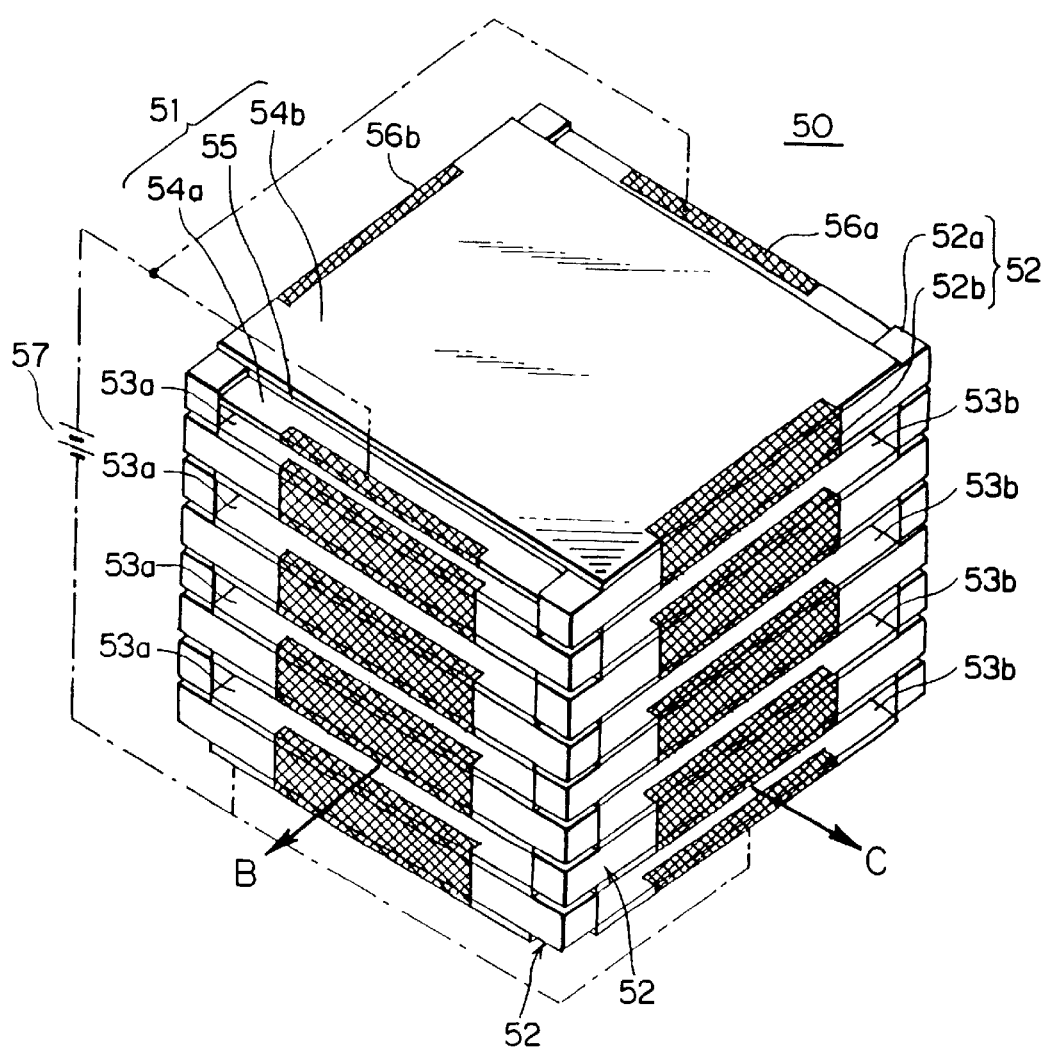
FIG. 1 is a perspective view illustrating a solid polyelectrolytic module of a first embodiment of the present invention.

FIG. 1 is a perspective view illustrating a solid polyelectrolytic module of a first embodiment of the invention.

In FIG. 1, a solid polyelectrolytic module 50 has a configuration in which a plurality of solid polyelectrolytic elements 51 are stacked with certain intervals kept by spacers 52, and form an integral body by being pressed from the both ends in the stacking direction. Air paths 53a and 53b for passage of air are formed between solid polyelectrolytic elements 51 formed at the certain intervals by the spacers 52. The spacers 52 are arranged crosswise at the both ends of the solid polyelectrolytic elements 51 so that air flows flowing through the adjacent air paths 53a and 53b form orthogonal flows.

The spacers 52 are prepared by attaching conductive metal plates 52b on surfaces of rectangular insulating blocks 52a made, for example, of a plastic material and arranged so that, when the solid polyelectrolytic elements 51 are stacked with the spacers 52 in between, the upper and lower solid polyelectrolytic elements are electrically connected via the conductive metal plates 52b.

The spacer 52 may be made of an electric conductor such as a carbon rod. In FIG. 1, 57 is a DC power source, and arrows B and C represent air flows.

Figure 2:
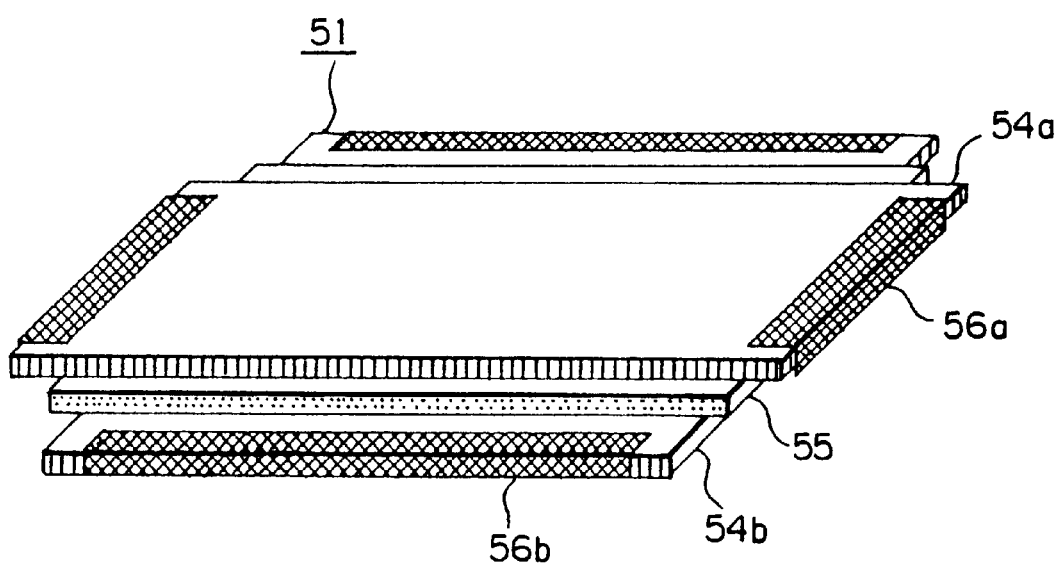
FIG. 2 is a perspective view illustrating a solid polyelectrolytic element used in the solid polyelectrolytic module of the first embodiment of the invention.

A configuration of the solid polyelectrolytic element 51 will now be described with reference to FIG. 2.

The solid polyelectrolytic element 51 is prepared into the form of a composite membrane by thermocompression bonding of a pair of porous electrodes 54a and 54b with the both surfaces of a hydrogen ion conductive solid polyelectrolyte membrane 55 which is selectively passed through hydrogen ions (protons). Electric contacts 56a and 56b are attached, by soldering for example, respectively, to the both ends of the porous electrodes 54a and 54b so as to come in electrical contact with the porous electrodes. The porous electrodes 54a and 54b are thermally pressure-connected to the both surfaces of the solid polyelectrolyte membrane 55 at right angles, and the electric contacts 56a and 56b thereof are arranged so as to protrude from the four sides of the solid polyelectrolyte membrane 55.

A platinum-based metal catalyst layer not shown is formed on the connecting interface between the porous electrodes 54a and 54b and the solid polyelectrolyte membrane 55, to ensure a higher activity of the electrolytic reaction on the electrode surfaces.

The porous electrodes 54a and 54b are made of expanded titanium plated with platinum, for example. The porous electrode 54b on the cathode side may be made of non-woven carbon fiber. NAPHION (registered trademark of Du Pont Company) film is used as the solid polyelectrolyte membrane 55.

Figure 3:
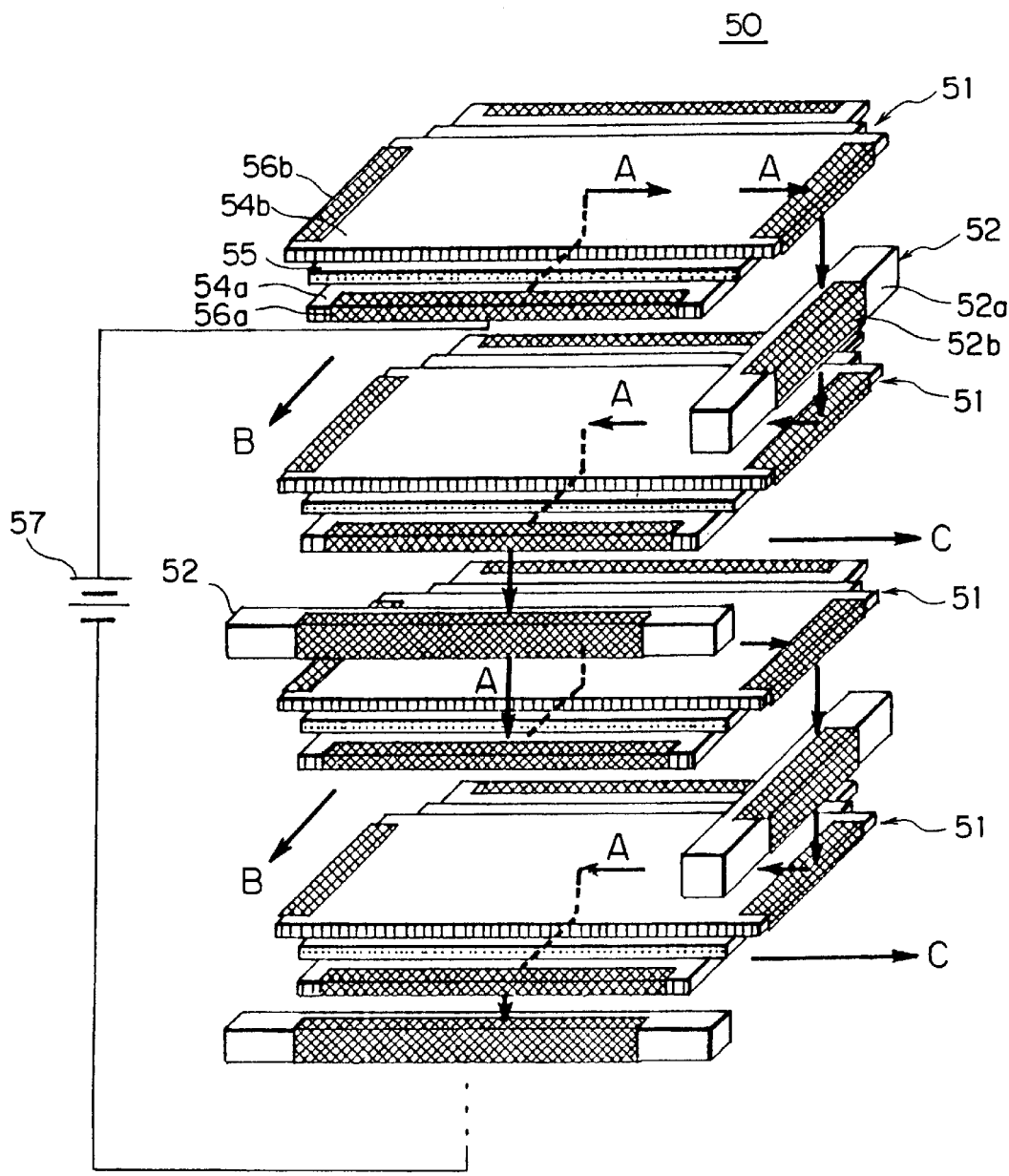
FIG. 3 is an exploded perspective view illustrating the solid polyelectrolytic module of the first embodiment of the invention.

The electrical connection between the solid polyelectrolytic elements 51 will now be described with reference to FIG. 3.

The solid polyelectrolytic elements 51 are stacked while holding spacers 52 forming an air path 53a (53b) between the both ends thereof. The spacers 52 are disposed at the both ends of the solid polyelectrolytic elements 51 so as to arrange a direction thereof alternately in a stacking direction, although only the spacer 52 on one side is drawn in FIG. 3 to simplify illustration.

The electric contacts 56a and 56b attached to the porous electrodes 54a and 54b are electrically connected to the conductive metal plate 52b of the spacer 52 during the stacking process. The elements are connected electrically in series so that the cathode of the fore-positional element comes into contact with the anode of the post-positional element, and anode of the fore-positional element comes into contact with the cathode of the post-positional element. The current flow is directed as shown by the arrow A so that the anodes or the cathodes face those of the same polarity via the spacers 52 between stages of the solid polyelectrolytic elements 51.

As a result, the air flow flowing between the anodes as shown by the arrow B and the air flow flowing between the cathodes as shown by the arrow C cross each other at right angles. The air flows flowing between the same electrodes form flows in the same direction.

Operations of the solid polyelectrolytic module 50 will now be described.

The solid polyelectrolytic elements 51 forming the solid polyelectrolytic module 50 hold the solid polyelectrolyte membrane 55 allowing selective passage of hydrogen ions (protons) in between the porous electrodes 54a and 54b, and are formed into a composite membrane by thermocompression bonding of the porous electrodes 54a and 54b via a catalyst layer accelerating the electrolytic reaction with the solid polyelectrolyte membrane 55.

The solid polyelectrolytic elements 51 are connected to a DC power source 57 so that the dehumidified side serves as the anode side and the humidifying side serves as the cathode side. When power is fed from the DC power source to the space between the porous electrode 54a on the anode side and the porous electrode 54b on the cathode side, steam contained in the air on the anode side is electrolyzed. Water molecule is decomposed through the reaction of Formula (1), producing oxygen, with a decrease in humidity:

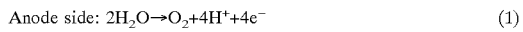

$$\text{Anode side: } 2H_2O \rightarrow O_2 + 4H^+ + 4e^- \qquad (1)$$

Further, along with the hydrogen ions moving from the anode side through the solid polyelectrolyte membrane 55 to the cathode side, from one to three water molecules move from the anode side to the cathode side. Because of consumption of water molecules on the anode wide, therefore, humidity decreases and a dry air is available.

Hydrogen ions (H⁺) produced on the anode side, upon the aforementioned electrolytic reaction pass through the solid polyelectrolyte membrane 55 and reach the cathode. Electrons (e⁻) reach on the other hand the cathode through the external circuit, and consume oxygen on the cathode side via the reaction of Formula (2) to generate water.

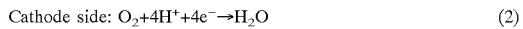

$$\text{Cathode side: } O_2 + 4H^+ + 4e^- \rightarrow H_2O \qquad (2)$$

This humidifies the air flowing on the cathode side to form humid air.

As a result of the aforementioned actions, the air flow shown by the arrow B flowing through the air path 53a formed by the opposed anodes of the solid polyelectrolytic module 50 is dehumidified to become dried air flow because steam contained in air is consumed through electrolysis. By connecting the air path to, for example, a prescribed closed space not shown, it is possible to achieve a dried space.

The air flow represented by the arrow C flowing through the air path 53b composed of the cathodes opposed to each other is humidified, on the other hand, to become humid air because oxygen is consumed, generating steam. The air flows shown by the arrows B and C form orthogonal flows crossing each other at right angles so that these flows derive air from different directions, respectively, and the paths are free from a bend within the module to reduce the pressure loss.

The power necessary for the electrolytic reactions expressed by the aforementioned Formula (1) and (2) is fed from the DC power source 57. Since all the solid polyelectrolytic elements 51 are connected in series, feeding an amount of current sent to a single solid polyelectrolytic element 51 to the solid polyelectrolytic module 50 permits achievement of the above-mentioned electrolytic reactions for the entire elements.

The source voltage of the DC power source takes a value resulting from multiplication of the voltage impressed on a single solid polyelectrolytic element 51 by the number of the elements connected in series. Since the voltage impressed on a single solid polyelectrolytic element 51 is about 2 V, and if the number of elements connected in series is assumed to be N, then, a DC power source having a source voltage value of about 2 N V would be connected. In general, the size of a DC power source depends substantially upon current capacity thereof. Downsizing of the DC power source is therefore achieved by connecting all the solid polyelectrolytic elements 51 in series, and minimizing the amount of current fed to the solid polyelectrolytic module.

According the first embodiment, as described above, when a plurality of solid polyelectrolytic elements 51 are stacked and pressed via the spacers 52 having conductive metal plates 52b, there is formed a three-dimensional electrolytic reaction surface in which the opposite electrodes 54a and 54b form an electrode surface of the same polarity. Air paths 53a and 53b are formed on each polarity side, and elements 51 are electrically connected in series. There is therefore available a solid polyelectrolytic module which permits simplification of module assembly and electric connection, minimization of the fed current value, and downsizing of the power feeding system.

Second Embodiment

Figure 4:
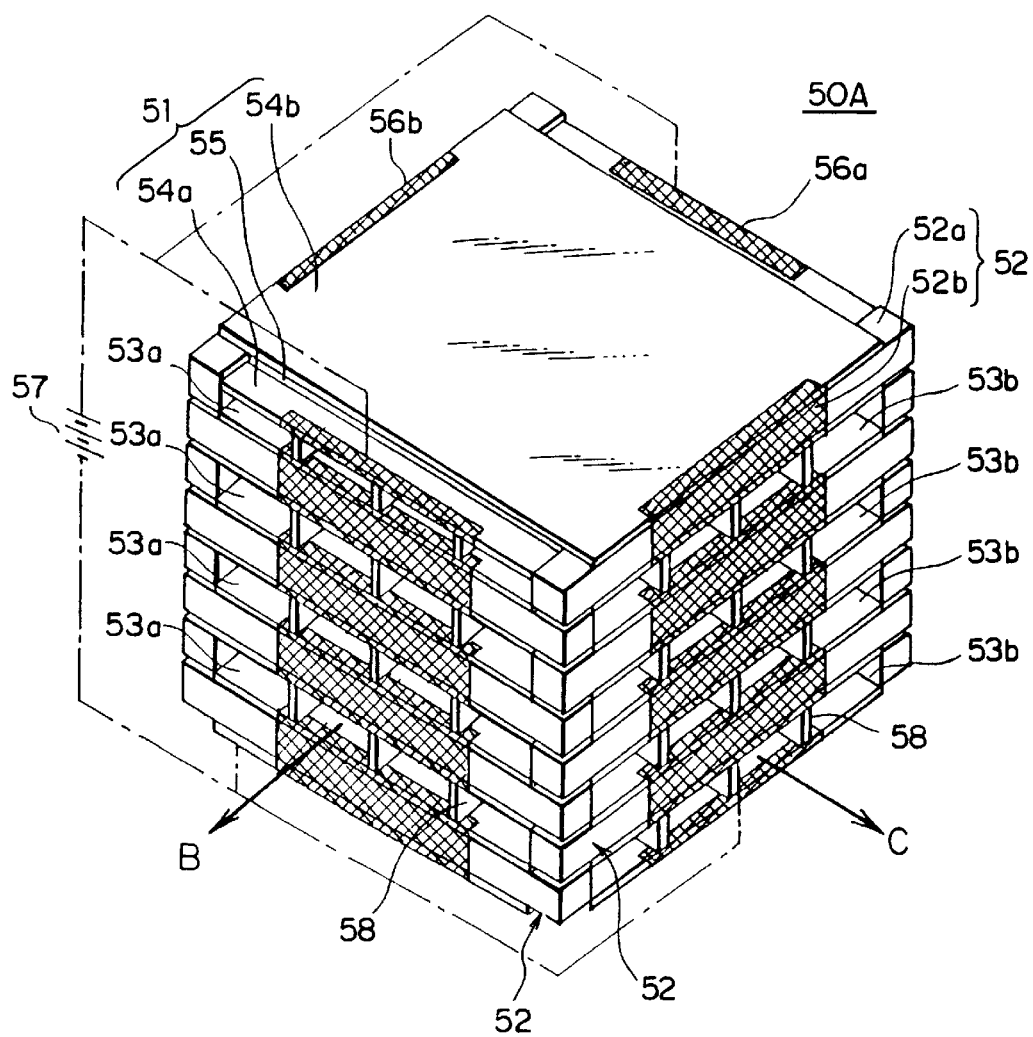
FIG. 4 is a perspective view illustrating a solid polyelectrolytic module of a second embodiment of the invention.

In a second embodiment of the invention, a plurality of flat sheet-shaped supporting members 58 are inserted at equal intervals between the solid polyelectrolytic elements 51 in parallel with the spacers 52 to maintain a space between two adjacent solid polyelectrolytic elements 51 as shown in FIG. 4. For all the other aspects, the second embodiment has the same configuration as that of the aforementioned first embodiment.

Since voltage acts between opposite solid polyelectrolytic elements 51, the supporting member 58 comprises an insulating plate made of a plastic material.

In the above-mentioned solid polyelectrolytic module 50 of the first embodiment, only the ends of the surfaces of the solid polyelectrolytic elements 51 are supported by the spacers 52. When there is a operating pressure difference between the air flow B on the anode side and the air flow C on the cathode side, therefore, a surface pressure acts on the surfaces of the element 51 and may cause deformation.

In the solid polyelectrolytic module 50A of this second embodiment, however, in which the supporting members 58 are arrange in a space lattice shape, the surfaces of the solid polyelectrolytic elements 51 are multi-linearly supported, thereby increasing mechanical strength.

Therefore, even when there is an operating pressure difference between the air flow B on the anode side and the air flow C on the cathode side, or even upon occurrence of a partial deformation or a mechanical vibration, deformation of the element surfaces is inhibited, thereby permitting prevention of a breakage accident caused by a deformation of the element surfaces.

The supporting members 58, being arranged along the flow of air, never impair the flow of air, and never produce stagnation of air flow.

In this respect, the member of the supporting members 58 is limited to the minimum necessary number so that stagnation of air flow on the electrolytic reaction surfaces of the solid polyelectrolytic elements 51 never impairs electrolytic reactivity.

In the second embodiment, the plurality of flat sheet-shaped supporting members 58 are inserted at equal intervals between the solid polyelectrolytic elements 51 in parallel with the spacers 52, thereby multi-linearly supporting the whole surfaces of the solid polyelectrolytic elements 51. A similar effect is available also by providing a plurality of small disk-shaped supporting members uniformly between the solid polyelectrolytic elements 51 and supporting the whole surfaces of the solid polyelectrolytic elements at multiple points.

Third Embodiment

In the aforementioned first and second embodiments, when forming a solid polyelectrolytic module 50 or 50A as shown in FIGS. 1 and 4, the solid polyelectrolytic elements 51 are stacked via the spacers 52 at certain intervals to form the air paths 53a and 53b. A square-shaped electrolytic reaction surface is formed by arranging the spacers 52 at the both ends of the solid polyelectrolytic elements 51 in a space lattice shape. As a result, two adjacent sides of the electrolytic reaction surface have the same length, thus preventing achievement of a thinner module. In this third embodiment, there is available a solid polyelectrolytic module capable of coping with a requirement for a thin-shaped module.

Figure 5:
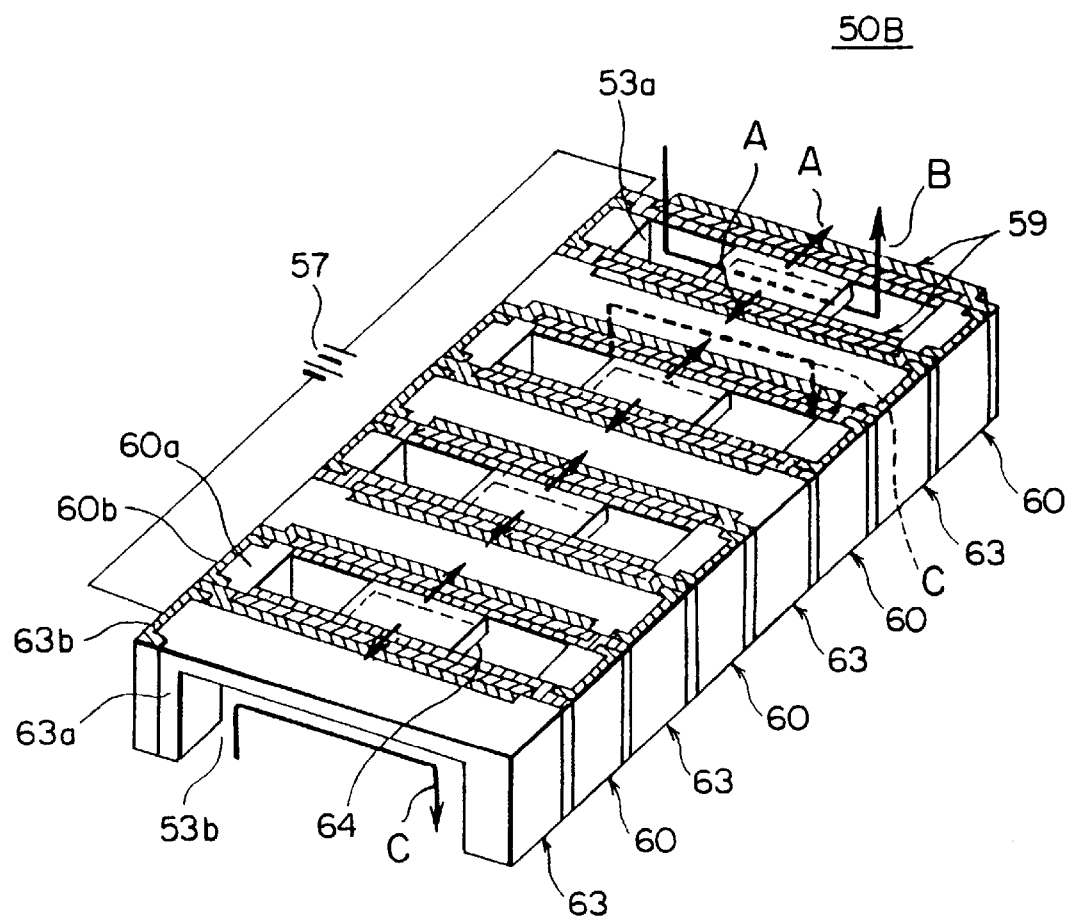
FIG. 5 is a perspective view illustrating a solid polyelectrolytic module of a third embodiment of the invention.
Figure 6:
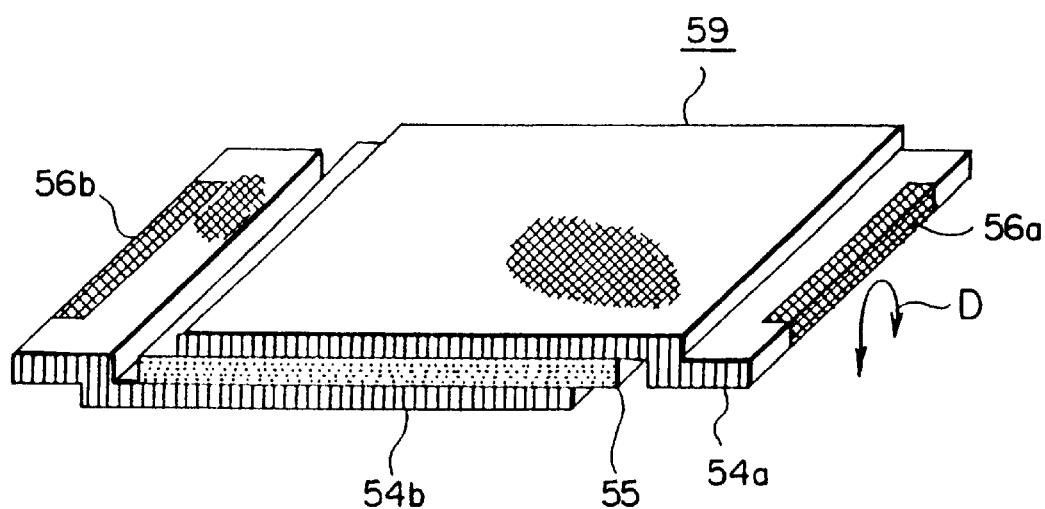
FIG. 6 is a perspective view illustrating a solid polyelectrolytic element used in the solid polyelectrolytic module of the third embodiment of the invention.

FIG. 5 is a perspective view illustrating the solid polyelectrolytic module of the third embodiment of the invention; FIG. 6 is a perspective view illustrating the solid polyelectrolytic element used in the solid polyelectrolytic module of the third embodiment of the invention; and FIG. 7 is an exploded perspective view illustrating the solid polyelectrolytic module of the third embodiment of the invention.

The solid polyelectrolytic element 59 of the third embodiment has the same electrochemical functions as those of the aforementioned solid polyelectrolytic element 51. More particularly, as shown in FIG. 6, a pair of porous electrodes 54a and 54b are thermally pressure-connected with a hydrogen ion conductive solid polyelectrolyte membrane 55 in between and are thus fixed to the both surfaces of the solid polyelectrolyte membrane 55. Thermal pressure-connection, that is, thermocompression bonding is accomplished so that a side of each of the pair of porous electrodes 54a and 54b protrudes from the other side of the solid polyelectrolyte membrane 55, respectively, and the other side is shifted on the surface so as to expose the surface of the solid polyelectrolyte membrane 55. The thus formed composite membrane is folded in the arrow D direction at the center to form a U-shaped solid polyelectrolytic element 59. Electric contacts 56a and 56b may be attached to the end faces of the porous electrodes 54a and 54b protruding from the end face of the solid polyelectrolyte membrane 55.

The spacer 60 is manufactured so that electric contacts 60b are disposed along the end surfaces of the both sides of an insulating frame 60a formed into U-shape, respectively, and the both ends thereof are exposed on the surface and back of the insulating frame 60a. On the other hand, the spacer 63 is manufactured so that an electric contact 60b is disposed along the end surface of one side of another insulating frame 63a formed into U-shape, respectively, and the both ends thereof are exposed on the surface and back of the insulating frame 63a.

Figure 7:
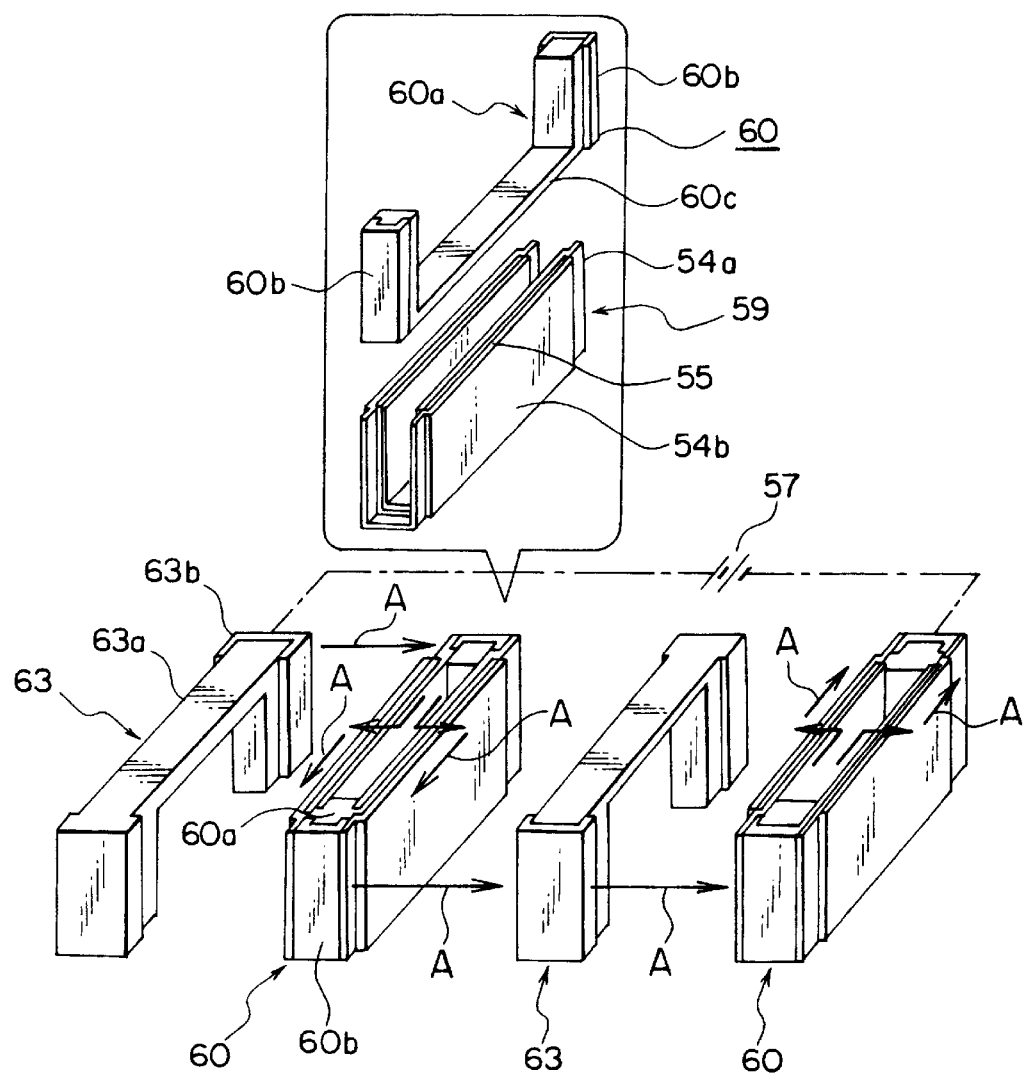
FIG. 7 is an exploded perspective view illustrating the solid polyelectrolytic module of the third embodiment of the invention.

The solid polyelectrolytic module 50B of the third embodiment is prepared by arranging a plurality of solid polyelectrolytic elements 59 formed into U-shape so as to turn the folded sides thereof toward the same direction as shown in FIG. 7, inserting a spacer 60 between surfaces opposed as a result of folding of each solid polyelectrolytic element 59, further inserting a spacer 63 between two adjacent solid polyelectrolytic elements 51, and pressing the same from the both ends in the stacking direction, thereby forming the module integrally. Insulating air path forming members 64 are inserted between surfaces of the solid polyelectrolytic elements opposed at the center on the opening side of the spacers 60 and 63. The bottom side 60c of the spacer 60 is inserted to fit the folded portion of the U-shaped solid polyelectrolytic element 51, and the spacers 60 and 63 are arranged so that the opening sides thereof are alternate.

An air path 53a is formed by the space between the surfaces opposed as a result of folding of the solid polyelectrolytic element 59 and the spacer 60, and an air path 53b is formed by the space between the opposed surfaces of adjacent solid polyelectrolytic elements 59 and the spacer 63. The electric contacts 56a and 56b formed on the porous electrodes 54a and 54b of the solid polyelectrolytic element 59 are electrically connected to the electric contacts 60b and 63b of the spacers 60 and 63 during the stacking process of the elements. The cathode of the fore-positional element is connected to the anode of the post-positional element in series, and otherwise, the anode of the fore-positional element is connected to the cathode of the post-positional element in series, so that an anode side electrolytic reaction surface and a cathode side electrolytic reaction surface formed into a wave form are on the same polarity sides, respectively. For example, by feeding current in the arrow A direction in FIGS. 5 and 7, an electric connection is made so that the anode side electrolytic reaction surface faces the upper side of paper, and the cathode side electrolytic reaction surface faces the lower side of the paper.

In the solid polyelectrolytic module 50B having the configuration as described above, as shown in FIG. 5, air path forming members 64 are attached at the opening centers of the spacers 60 and 63, and current is fed in the arrow A direction, thereby forming an air channel 53a on the anode side above the paper surface. When air is fed along the arrow B, as in the above-mentioned first embodiment, steam in the air is consumed through electrolysis based on the electrolytic reaction shown by Formula (1), thus reducing humidity of the air into dried air. The air channel 53b on the cathode side is formed below the paper surface. When air is fed along the arrow C, therefore, oxygen in the air is consumed through the electrolytic reaction expressed by Formula (2), producing steam and causing the air flow to become humidity air.

Because all the solid polyelectrolytic elements 59 are connected in series, the electrolytic reaction is accomplished for all the elements by feeding the amount of current fed to a single solid polyelectrolytic element 59 to the solid polyelectrolytic module 50B, and downsizing of the DC power source is achieved by reducing the amount of current fed to the solid polyelectrolytic module 50B.

According to the third embodiment, as described above, when stacking and pressing the plurality of solid polyelectrolytic elements 59 via the spacers 60 and 63, there is formed a three-dimensional electrolytic reaction surface in which the opposed porous electrodes 54a and 54b make an electrode surface of the same polarity. At the same time, the air channel 53a or 53b is formed on each polarity, and the elements 59 are connected electrically in series. As in the aforementioned first embodiment, therefore, there is available a solid polyelectrolytic module which permits simplification of assembly and electric connection of the module, reduction of the value of fed current, and downsizing of the power feeding system.

Since the solid polyelectrolytic module 50B is formed by stacking the folded solid polyelectrolytic elements 59 with the spacers 60 and 63 in between, the module has a thickness a half the width of the solid polyelectrolytic element 59, thus enabling to meet the requirement for a thinner module.

For the aforementioned third embodiment, the description has covered a case in which the solid polyelectrolytic elements 59 folded in a U-shape with spacers 60 in between are arranged in series with spacers 63 in between. The shape of the solid polyelectrolytic element is not limited to the U-shape, but a W-shaped arrangement or a serial arrangement of the elements folded into a plurality of turns with spacers 60 between turns and further with spacers 63 between elements is also applicable.

Fourth Embodiment

Figure 8:
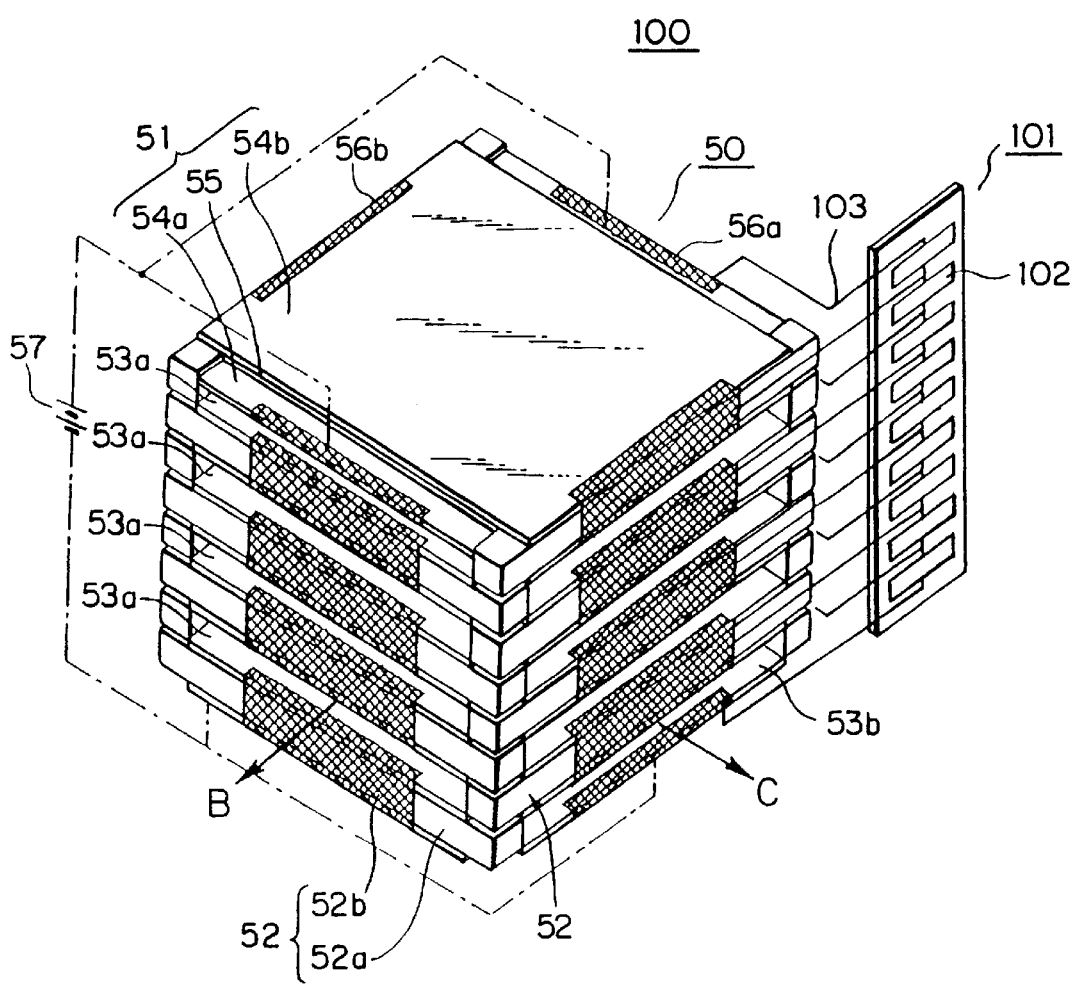
FIG. 8 is a perspective view illustrating a solid polyelectrolytic apparatus of a fourth embodiment of the invention.
Figure 9:
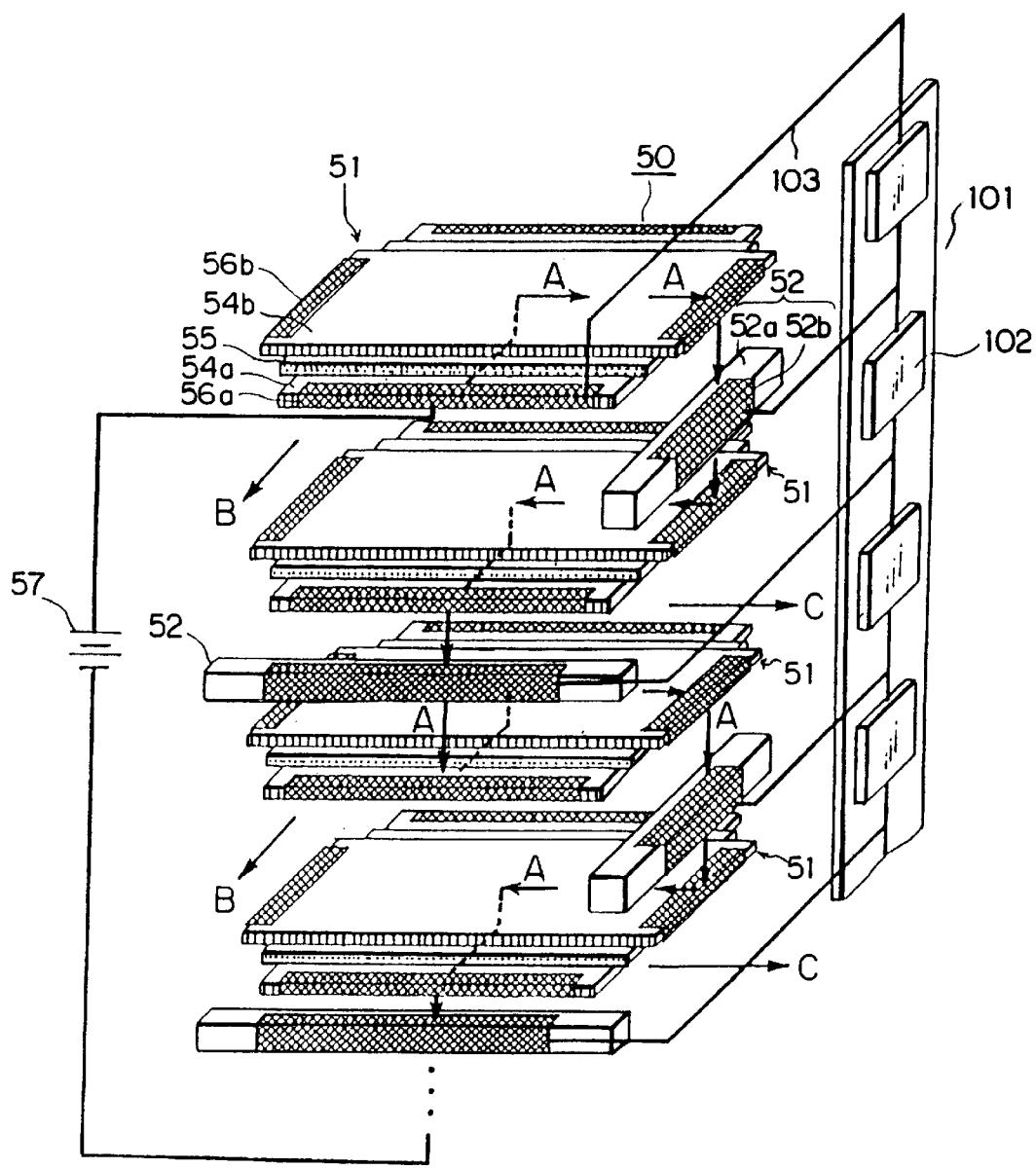
FIG. 9 is an exploded perspective view illustrating a solid polyelectrolytic apparatus of the fourth embodiment of the invention.

FIG. 8 is a perspective view illustrating a solid polyelectrolytic apparatus of a fourth embodiment of the invention; and FIG. 9 is an exploded perspective view illustrating the solid polyelectrolytic apparatus of the fourth embodiment of the invention; only spacers 52 are shown in FIG. 9 for simplification of illustration.

In FIGS. 8 and 9, the solid polyelectrolytic apparatus 100 is composed of a solid polyelectrolytic module 50 and an electric bypass unit 101. The electric bypass unit 101 has bypass circuits 102 in a number equal to that of solid polyelectrolytic elements composing a solid polyelectrolytic module 50. The bypass circuit 102 are connected with connecting lines 103 to conductive metal plates 52b of the spacers 52 inserted between the solid polyelectrolytic elements 51, and provided electrically in parallel relative to the solid polyelectrolytic elements 51.

Figure 10:
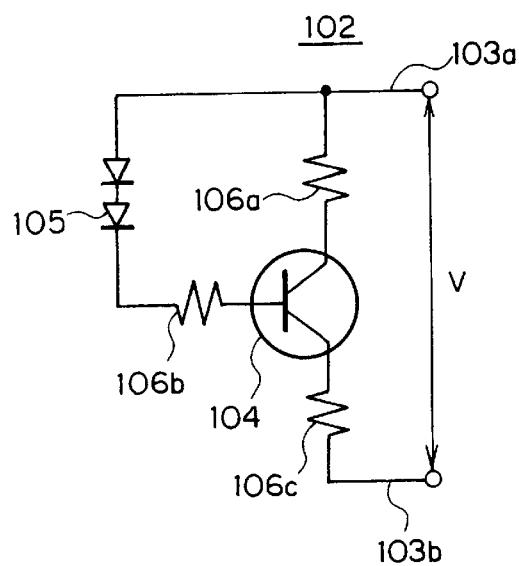
FIG. 10 is a circuit diagram illustrating a bypass circuit used in the solid polyelectrolytic apparatus of the fourth embodiment of the invention.

As shown in FIG. 10, the bypass circuit 102 comprises a transistor 104, a diode 105 inserted in a positive direction relative to base current, a resistor 106a adjusting collector current, a resistor 106b adjusting base current, and a resistor 106c adjusting emitter current. A collector-emitter circuit of the transistor 104 is connected to the conductive metal plate 52b of the spacer 52 provided between stages so as to be connected with connecting lines 103a and 103b to porous electrodes 54a and 54b of each solid polyelectrolytic element 51.

Figure 11:
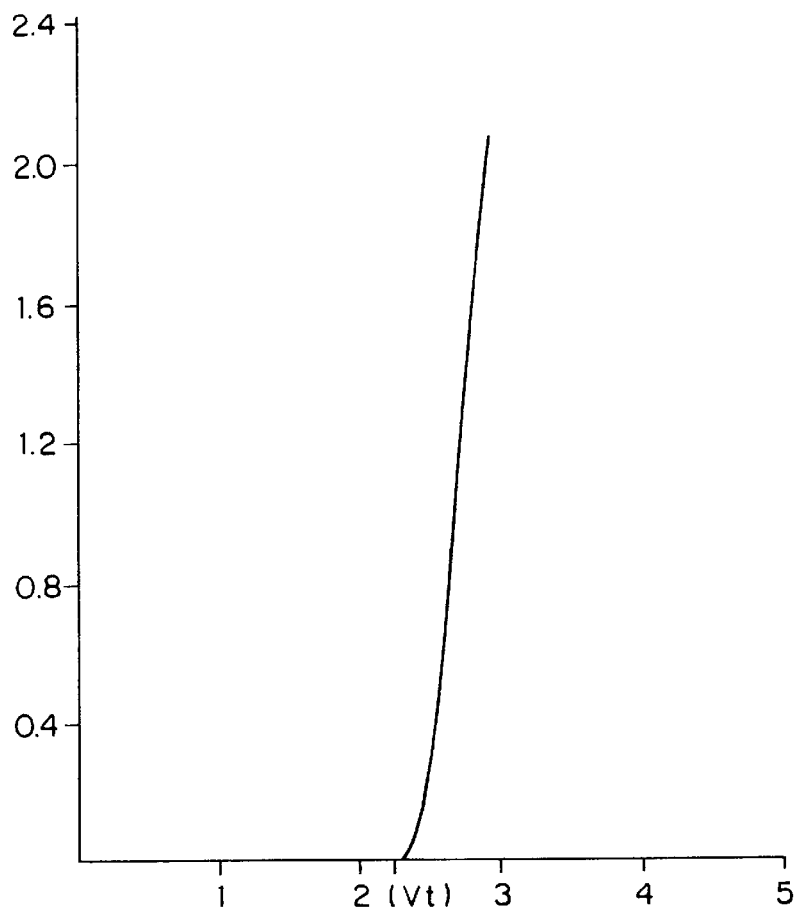
FIG. 11 is a graph illustrating electrical properties of the bypass circuit used in the solid polyelectrolytic apparatus of the fourth embodiment of the invention.

As shown in FIG. 11, the bypass circuit 102 has an electric characteristic in which the collector current value I is zero at a voltage value V between the correcting lines 103a and 103b of under a set value Vt, and the collector current value I steeply rises up when the voltage value V reaches the set value Vt. Circuit components and a circuit constant are set so that the set value Vt is slightly smaller than a peak voltage value Vkp of the solid polyelectrolytic element 51 described later: the number of diodes 105 and the resistance value of the resistors 106b and 106c are adjusted.

Operations of a solid polyelectrolytic apparatus not having an electric bypass unit 101 will now be described with a view to describing the effects of the solid polyelectrolytic apparatus 100 having the configuration as described above.

Power necessary for the electrolytic reaction expressed by the aforementioned Formulae (1) and (2) is fed from a DC power source 57. As all the solid polyelectrolytic elements 51 are connected in series, these electrolytic reactions are accomplished for all the solid polyelectrolytic elements 51 by feeding the amount of current fed to a single solid polyelectrolytic element 51 to the entire solid polyelectrolytic module 50.

If all the solid polyelectrolytic elements 51 are uniform in electric characteristics, there is no problem. If the solid polyelectrolytic elements 51 are not uniform in electric characteristics, however, the electrolytic capacity of the individual solid polyelectrolytic elements 51 cannot fully be utilized, or variations are cause in inter-electrode voltage, resulting in deterioration of the electrolytic property along with expansion of such defects. It is therefore necessary to take some measures to keep a constant inter-electrode voltage.

Figure 12:
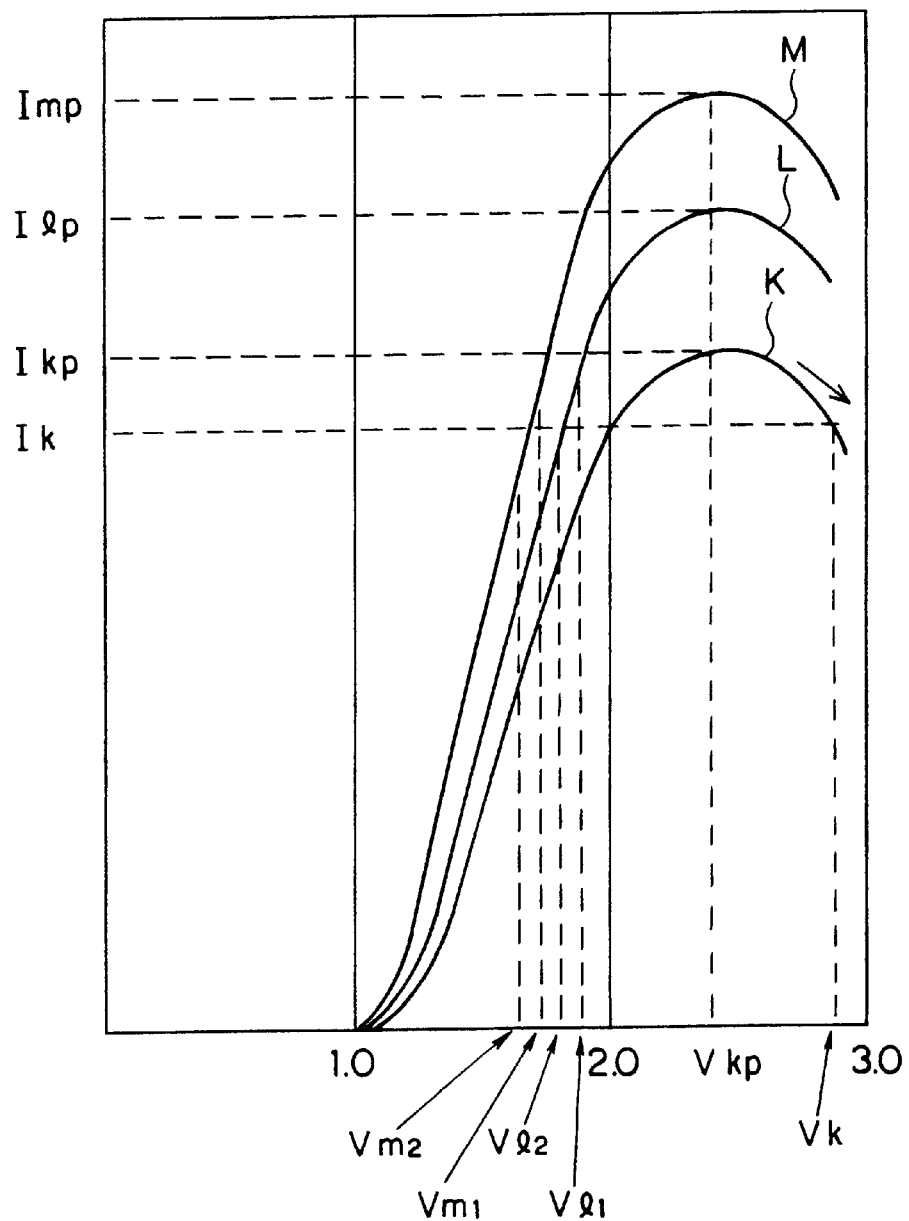
FIG. 12 is a graph illustrating voltage-current characteristics of the solid polyelectrolytic element used in the solid polyelectrolytic apparatus of the fourth embodiment of the invention.

As shown in FIG. 12, typical electric characteristics of the solid polyelectrolytic element 51 are that no current flows at an inter-electrode voltage of under 1 V, and upon exceeding 1 V, current begins suddenly flowing, producing a peak between 2 and 2.5 V, and thereafter, current decreases on the contrary. Between the solid polyelectrolytic elements 51, there are variations in the maximum peak value, although the shape of the voltage-current curve remains substantially constant.

FIG. 12 illustrates a case in which variations represented by three curves K, L and M are present in the voltage-current curve for the solid polyelectrolytic elements 51 composing the solid polyelectrolytic module 50. When a peak voltage value Vkp is impressed on the solid polyelectrolytic element 51 having electric characteristics of the curve K having the smallest peak value, current Ikp flows to all the solid polyelectrolytic elements 51, because all the solid polyelectrolytic elements 51 forming the solid polyelectrolytic module 50 are connected in series.

At this point, the inter-electrode voltage of the solid polyelectrolytic elements having electric characteristics as represented by the curves L and M is Vl1 and vm1, respectively, smaller than the peak voltage value. As a result, the solid polyelectrolytic elements 51 having electric characteristics of curves L and M operate with current values smaller than the peak current values of Ilp and Imp, respectively, leading to an operation in a state in which characteristics cannot fully be derived. In other words, the operating condition of the solid polyelectrolytic module 50 is limited by the solid polyelectrolytic element 51 having electric characteristics of the curve K of the smallest peak value.

When impressing a voltage Vk larger than the peak voltage value Vkp onto the solid polyelectrolytic element 51 having electric characteristics of curve K, the current value decreases to Ik along the arrow in FIG. 12. In this state, the inter-electrode voltage of the solid polyelectrolytic elements 51 having electric characteristics of curves L and M decreases further to Vl2 and Vm2, respectively, thus resulting in a wider inter-electrode voltage difference between the solid polyelectrolytic elements 51. A lower fed current value thus causes an instable state leading to further deterioration of electric characteristics.

In this solid polyelectrolytic apparatus 100, a bypass circuit 102 is connected in parallel between the electrodes of each solid polyelectrolytic element 51. Circuit components and a circuit constant are set for each bypass circuit 102 so that the voltage value Vt representing steep rise-up of current becomes slightly smaller than the peak voltage value of the solid polyelectrolytic element 51.

When the inter-electrode voltage of the solid polyelectrolytic element 51 increases during driving of the solid polyelectrolytic module 50 and exceeds the voltage value Vt, the current begins flowing to the bypass circuit 102, and the inter-electrode voltage of the electrolytic elements is controlled to below the peak voltage value Vkp.

For the solid polyelectrolytic element 51 of which the inter-electrode voltage has increased and exceeded the voltage value Vt, the current flows through that electrolytic element and the bypass circuit 102 to the solid polyelectrolytic element 51 of the next stage (the post-positional element 51). As a result, voltage is uniformly distributed to all the solid polyelectrolytic elements 51, and a current near the respective peak current value is fed to each solid polyelectrolytic elements 51.

According to the fourth embodiment, as described above, the bypass circuit 102 is connected electrically in parallel to each solid polyelectrolytic element 51, so that the inter-electrode voltage of each solid polyelectrolytic element 51 is controlled to below the peak voltage value Vkp. As a result, the inter-electrode voltage is prevented from going over the peak voltage value Vkp and entering the instable region, and solid polyelectrolytic module 50 can be operated in a stable condition.

Since this leads to uniform distribution of voltage to all the solid polyelectrolytic elements 51, and to feeding of current having a current value near the peak current value to each solid polyelectrolytic element 51, it is possible to drive the solid polyelectrolytic module 50 so as to fully derive the electrolytic property of each solid polyelectrolytic element 51 even when there are variations of electric characteristics of the solid polyelectrolytic element 51.

Because the bypass circuit 102 comprises inexpensive components such as a transistor 104, diodes 105 and resistors 106a, 106b and 106c, it is possible to achieve a lower equipment cost.

Setting of a voltage value Vt of the bypass circuit 102 will now be described.

The voltage value Vt of each bypass circuit 102 takes the best value when it agrees with the peak voltage value Vkp of the solid polyelectrolytic element 51 to which the bypass circuit 102 is connected in parallel. Because there are variations in electric characteristics of the solid polyelectrolytic element 51, however, it is very difficult to cause the voltage value Vt of each bypass circuit 102 to agree with the peak voltage value Vkp of the solid polyelectrolytic element 51. In practice, therefore, the voltage value Vt of each bypass circuit 102 is controlled within a prescribed range containing the peak voltage value Vkp of the solid polyelectrolytic element 51.

In typical electric characteristics of the solid polyelectrolytic element 51, the peak voltage value Vkp is within a range of from 2 to 2.5 V. The voltage value Vt of each bypass circuit 102 should preferably be controlled within a range of from 2 to 3 V. In this case, even when there are variations in electric characteristics of the solid polyelectrolytic element 51, the voltage value Vt of the bypass circuit 102 takes a value similar to the peak voltage value Vkp of the solid polyelectrolytic element 51, and the solid polyelectrolytic module 50 can be driven so as to derive sufficiently the electrolytic property of each solid polyelectrolytic element 51. It is not therefore necessary to prepare a bypass circuit in compliance with the electric characteristics of the solid polyelectrolytic element 51, thereby improving productivity and permitting achievement of a lower equipment cost.

Fifth Embodiment

Figure 13:
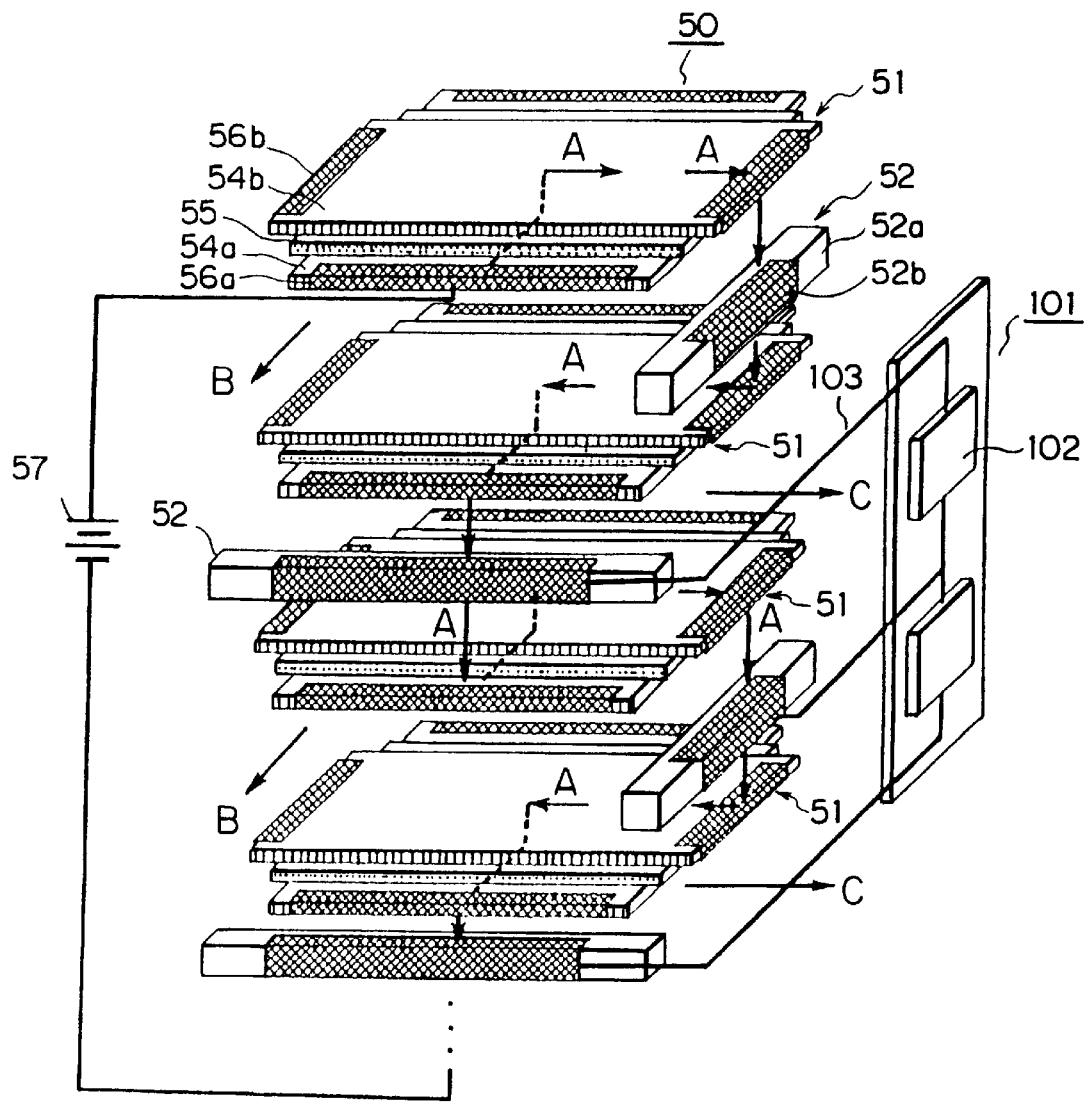
FIG. 13 is an exploded perspective view illustrating a solid polyelectrolytic apparatus of a fifth embodiment of the invention.
Figure 14:
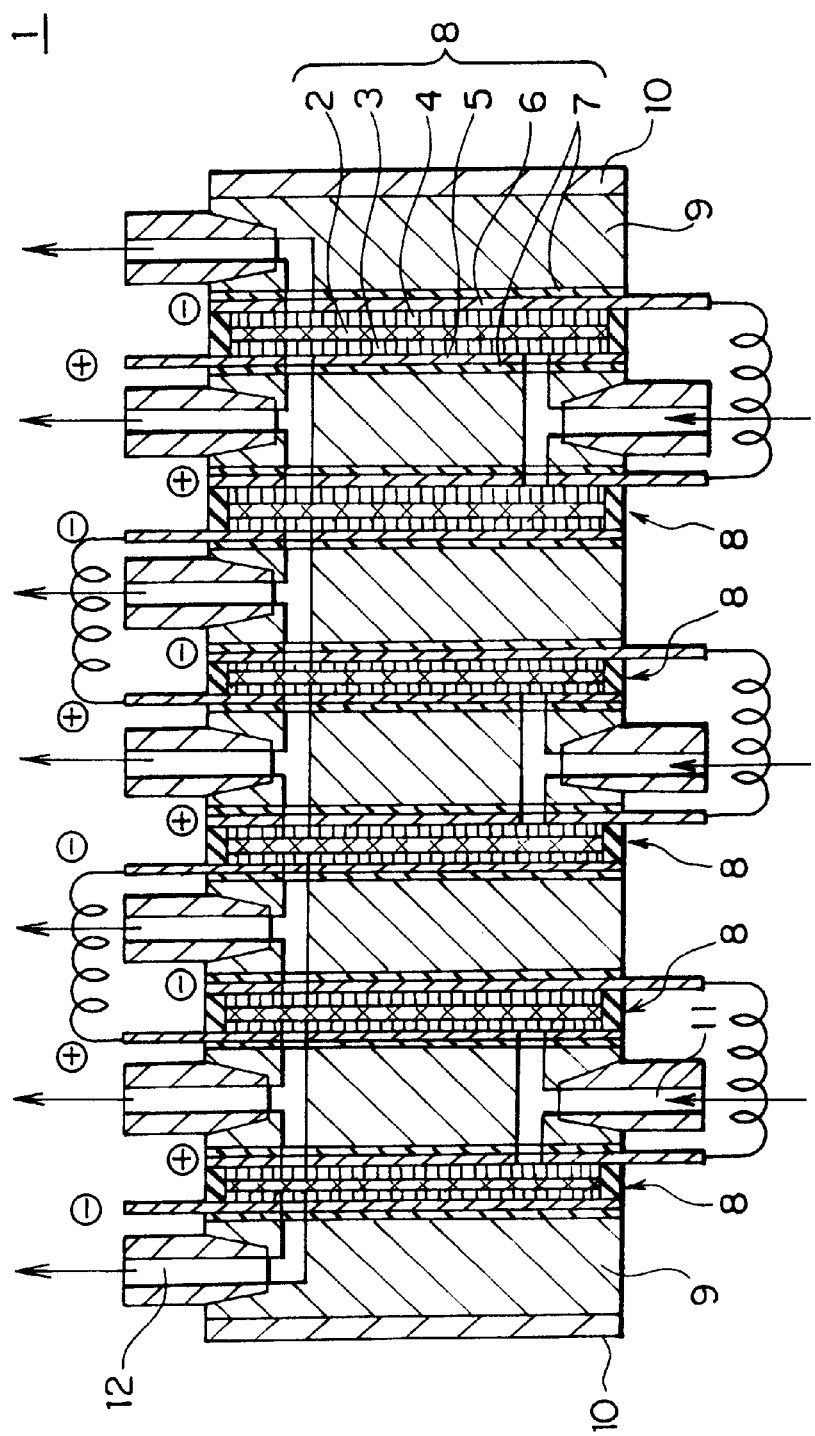
FIG. 14 is a longitudinal sectional view illustrating an overall configuration of a conventional solid polyelectrolyte membrane electrolysis apparatus for electrolyzing water by the use of a hydrogen ion conductive solid polyelectrolyte membrane.
Figure 15:
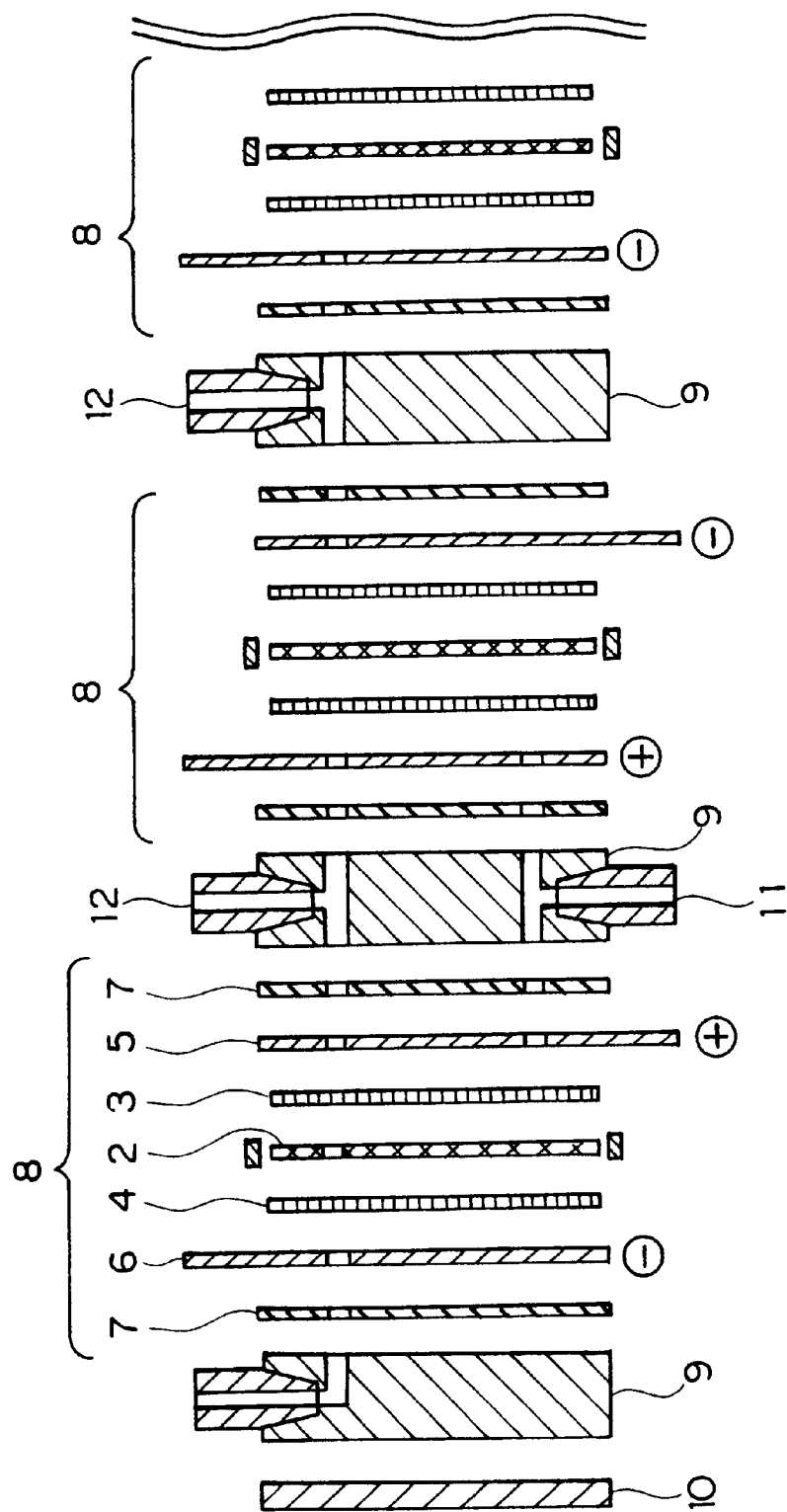
FIG. 15 is a longitudinal sectional view illustrating an exploded state of the conventional solid polyelectrolyte membrane electrolysis apparatus for electrolyzing water by the use of the hydrogen ion conductive solid polyelectrolyte membrane.

In the aforementioned fourth embodiment, the bypass circuits 102 have been described to be connected electrically in parallel to the individual solid polyelectrolytic elements 51. In a fifth embodiment, as shown in FIG. 13, the bypass circuits 102 are connected electrically in parallel only to two solid polyelectrolytic elements 51.

In a solid polyelectrolytic module 50 of this type, the flow rate of air flowing through an air channel 53a (53b) may decrease, or stagnation may be produced in the flow of air in the air channel 53a (53b), because of the module structure. Driving of such a solid polyelectrolytic module 50 causes the inter-electrode voltage of the solid polyelectrolytic elements 51 facing the air channel 53a (53b) where the flow rate is low or there occurs stagnation to increase excessively.

In this fifth embodiment, the bypass circuits 102 are connected in parallel to the solid polyelectrolytic elements 51 facing the air channel 53b in which stagnation occurs in the air flow. When the inter-electrode voltage of the two solid polyelectrolytic elements 51 exceeds the voltage value Vt, therefore, current begins flowing into the bypass circuit 102, thus permitting inhibition of an excessive increase in inter-electrode voltage.

In the aforementioned fourth and fifth embodiments, the bypass circuit 102 comprises a transistor 104, diodes 105, and resistors 106a, 106b and 106c. However, the bypass circuit is not limited to such a configuration, but any configuration may be adopted so far as the circuit permits achievement of electric characteristics including a steep rise-up of current at a voltage value Vt.

Also in the fourth and fifth embodiments, the solid polyelectrolytic module 50 of the first embodiment is employed. The same effects are however available by using the solid polyelectrolytic module 50A or 50B of the above-mentioned second or third embodiment.

According to the present invention, there is provided a solid poyelectrolytic module comprising a plurality of solid polyelectrolytic elements stacked so as to constitute an air path between two adjacent solid polyelectrolytic elements in a state where spacers which at least a part thereof serves as conductive contact regions are interposed therebetween, respectively, each of the solid polyelectrolytic elements being formed by thermocompression bonding of porous electrodes with the both surfaces of a hydrogen ion conductive solid polyelectrolyte membrane, respectively; wherein the plurality of stacked solid polyelectrolytic elements are electrically connected to each other in series in such manner that one porous electrode of each of the solid polyelectrolytic elements is electrically connected to one porous electrode of a solid polyelectrolytic element adjacent thereto on one side via the conductive contact region of the spacer, and the other porous electrode of each of the solid polyelectrolytic elements is electrically connected to the other porous electrode of a solid polyelectrolytic element adjacent thereto on the other side via the conductive region of the spacer; and wherein the air paths formed between the solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of the plurality of solid polyelectrolytic elements and the other porous electrode of the solid polyelectrolytic element arranged at the other end of the plurality of solid polyelectrolytic elements. As a result, stacking of the plurality of solid polyelectrolytic elements via the spacers forms an air path and a three-dimensional electrolytic reaction surface. Further, since the solid polyelectrolytic elements are connected electrically in series, assembly and electric connecting operations are simplified. Possibility of minimizing the fed current value gives a solid polyelectrolytic module in which the power feeding system can be downsized.

Each of the aforesaid plurality of solid polyelectrolytic elements is formed into a rectangular shape, and the plurality of solid polyelectrolytic elements are stacked so that the porous electrodes to serve as cathodes for the fore-positional elements and the porous electrodes to serve as anodes for the post-positional elements, or the porous electrodes to serve as anodes for the fore-positional elements and the porous electrodes to serve as cathodes for the post-positional elements, are connected by the conductive contact regions of the spacer to constitute an electric connection in series, and the porous electrodes having the same polarity face each other; and the spacers are arranged so that the air flow flowing through the air path formed by the anode surfaces and the air flow flowing through the air path formed by the cathode surfaces form orthogonal flows. As a result, manufacture of the solid polyelectrolytic elements is simple, and the air path can be formed with a straight channel, giving only a small amount of pressure loss of the air path, thus permitting use of an air blower having a small maximum static pressure value.

The aforementioned solid polyelectrolytic module further comprise a supporting member arranged between two adjacent solid polyelectrolytic elements in each of the air paths so as to mechanically support the adjacent solid polyelectrolytic element surfaces. It is therefore possible to provide a solid polyelectrolytic module resistant to a stress deformation caused by a difference in operating pressure, a thermal deformation or a mechanical vibration.

In the aforementioned plurality of solid polyelectrolytic elements, each of the plurality of solid polyelectrolytic elements is formed into a U shape, a W shape or a corrugate shape; the spacers are inserted between the folded and opposed surfaces of each solid polyelectrolytic element and between adjacent solid polyelectrolytic elements; the porous electrodes to serve as cathodes for the fore-positional elements and the porous electrodes to serve as anodes for the post-positional elements, or the porous electrodes to serve as anodes for the fore-positional elements and the porous electrodes to serve as cathodes for the post-positional elements, are connected by the conductive contact regions of the spacers to constitute an electric connection in series; and the air path formed by the anode surface and the air path formed by the cathode surface are formed alternately in the reverse direction. The module may have a thickness smaller than a half the width of the solid polyelectrolytic element, thus permitting achievement of a thin-shaped solid polyelectrolytic module.

The solid polyelectrolytic apparatus of the invention comprises a solid polyelectrolytic module having a plurality of solid polyelectrolytic elements stacked so as to constitute an air path between two adjacent solid polyelectrolytic elements in a state where spacers which at least a part thereof serves as conductive contact regions are interposed therebetween, respectively, each of the solid polyelectrolytic elements being formed by thermocompression bonding of porous electrodes with the both surfaces of a hydrogen ion conductive solid polyelectrolyte membrane, respectively, wherein the plurality of stacked solid polyelectrolytic elements are electrically connected to each other in series in such manner that one porous electrode of each of the solid polyelectrolytic elements is electrically connected to one porous electrode of a solid polyelectrolytic element adjacent thereto on one side via the conductive contact region of the spacer, and the other porous electrode of each of the solid polyelectrolytic elements is electrically connected to the other porous electrode of a solid polyelectrolytic element adjacent thereto on the other side via the conductive region of the spacer, and wherein the air paths formed between the solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of the plurality of solid polyelectrolytic elements and the other porous electrode of the solid polyelectrolytic element arranged at the other end of the plurality of solid polyelectrolytic elements; and a bypass circuit having a circuit configuration in which the bypass circuit is electrically connected in parallel between one porous electrode and the other porous electrode of the solid polyelectrolytic element, and a current steeply flows when the voltage between the both porous electrodes exceeds a set voltage value. There is therefore available a solid polyelectrolytic apparatus which permits driving the solid polyelectrolytic module so as to sufficiently derive electrolytic property of the solid polyelectrolytic elements, and ensures stable operations.

In the aforementioned solid polyelectrolytic apparatus, the apparatus has the bypass circuits in a number equal to that of the plurality of solid polyelectrolytic elements, and the bypass circuits are electrically connected in parallel between one porous electrode and the other porous electrode of each of the solid polyelectrolytic elements, respectively. It is therefore possible to drive the solid polyelectrolytic module so as to derive sufficiently electrolytic property of the individual solid polyelectrolytic elements.

Since the set voltage value of the bypass circuits is within a range of from 2 to 3 V, the set voltage value takes a value similar to the peak voltage value of the solid polyelectrolytic element even when there are variations in electric characteristics of the solid polyelectrolytic element, and it is possible to easily manufacture a bypass circuit at a lower cost.

The bypass circuit comprises a transistor, a diode inserted in a positive direction to that of a base current of the transistor, a resistor for adjusting a collector current of the transistor, another resistor for adjusting a base current of the transistor, and a further resistor for adjusting an emitter current of the transistor, thus permitting achievement of a lower equipment cost.

What is claimed is:

1. A solid polyelectrolytic module comprising a plurality of solid polyelectrolytic elements stacked so as to constitute an air path between two adjacent solid polyelectrolytic elements in a state where spacers which at least a part thereof serves as conductive contact regions are interposed therebetween, respectively, each of said solid polyelectrolytic elements being formed by thermocompression bonding of porous electrodes with the both surfaces of a hydrogen ion conductive solid polyelectrolyte membrane, respectively;

wherein said plurality of stacked solid polyelectrolytic elements are electrically connected to each other in series in such manner that one porous electrode of each of said solid polyelectrolytic elements is electrically connected to one porous electrode of a solid polyelectrolytic element adjacent thereto on one side via said conductive contact region of said spacer, and the other porous electrode of each of said solid polyelectrolytic elements is electrically connected to the other porous electrode of a solid polyelectrolytic element adjacent thereto on the other side via said conductive region of said spacer; and wherein said air paths formed between said solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of said plurality of solid polyelectrolytic elements and the other porous electrode of the solid polyelectrolytic element arranged at the other end of said plurality of solid polyelectrolytic elements.

2. A solid polyelectrolytic module according to claim 1, wherein each of said plurality of solid polyelectrolytic elements is formed into a rectangular shape, and said plurality of solid polyelectrolytic elements are stacked so that the porous electrodes to serve as cathodes for the fore-positional elements and the porous electrodes to serve as anodes for the post-positional elements, or the porous electrodes to serve as anodes for the fore-positional elements and the porous electrodes to serve as cathodes for the post-positional elements, are connected by the conductive contact regions of said spacer to constitute an electric connection in series, and said porous electrodes having the same polarity face each other; and wherein said spacers are arranged so that the air flow flowing through the air path formed by the anode surfaces and the air flow flowing through the air path formed by the cathode surfaces form orthogonal flows.

3. A solid polyelectrolytic module according to claim 2, further comprising a supporting member arranged between two adjacent solid polyelectrolytic elements in each of said air paths so as to mechanically support the adjacent solid polyelectrolytic element surfaces.

4. A solid polyelectrolytic module according to claim 1, wherein each of said plurality of solid polyeletrolytic elements is formed into a U shape, a W shape or a corrugate shape; said spacers are inserted between the folded and opposed surfaces of each solid polyeletrolytic element and between adjacent solid polyeletrolytic elements; the porous electrodes to serve as cathodes for the fore-positional elements and the porous electrodes to serve as anodes for the post-positional elements, or the porous electrodes to serve as anodes for the fore-positional elements and the porous electrodes to serve as cathodes for the post-positional elements, are connected by the conductive contact regions of said spacers to constitute an electric connection in series; and the air path formed by the anode surface and the air path formed by the cathode surface are formed alternately in the reverse direction.

5. A solid polyelectrolytic apparatus comprising:

a solid polyelectrolytic module having a plurality of solid polyelectrolytic elements stacked so as to constitute an air path between two adjacent solid polyelectrolytic elements in a state where spacers which at least a part thereof serves as conductive contact regions are interposed therebetween, respectively, each of said solid polyelectrolytic elements being formed by thermocompression bonding of porous electrodes with the both surfaces of a hydrogen ion conductive solid polyelectrolyte membrane, respectively, wherein said plurality of stacked solid polyelectrolytic elements are electrically connected to each other in series in such manner that one porous electrode of each of said solid polyelectrolytic elements is electrically connected to one porous electrode of a solid polyelectrolytic element adjacent thereto on one side via said conductive contact region of said spacer, and the other porous electrode of each of said solid polyelectrolytic elements is electrically connected to the other porous electrode of a solid polyelectrolytic element adjacent thereto on the other side via said conductive region of said spacer, and wherein said air paths formed between said solid polyelectrolytic elements adjacent to each other have a configuration such that an air flow along an anodic surface and an air flow along the cathodic surface are separately and independently formed upon feeding of a DC voltage to a space between one porous electrode of the solid polyelectrolytic element arranged at one end of said plurality of solid polyelectrolytic elements and the other porous electrode of the solid polyelectrolytic element arranged at the other end of said plurality of solid polyelectrolytic elements; and a bypass circuit having a circuit configuration in which said bypass circuit is electrically connected in parallel between one porous electrode and the other porous electrode of said solid polyelectrolytic element, and a current steeply flows when the voltage between said both porous electrodes exceeds a set voltage value.

6. A solid polyelectrolytic apparatus according to claim 5, wherein said apparatus has said bypass circuits in a number equal to that of said plurality of solid polyelectrolytic elements, and the bypass circuits are electrically connected in parallel between one porous electrode and the other porous electrode of each of said solid polyelectrolytic elements, respectively.

7. A solid polyelectrolytic apparatus according to claim 5, wherein the set voltage value of said bypass circuit is within a range of from 2 to 3 V.

8. A solid polyelectrolytic apparatus according to claim 5, wherein said bypass circuit comprises a transistor, a diode inserted in a positive direction to that of a base current of said transistor, a resistor for adjusting a collector current of said transistor, another resistor for adjusting a base current of said transistor, and a further resistor for adjusting an emitter current of said transistor.

* * * * *